Figure 1:
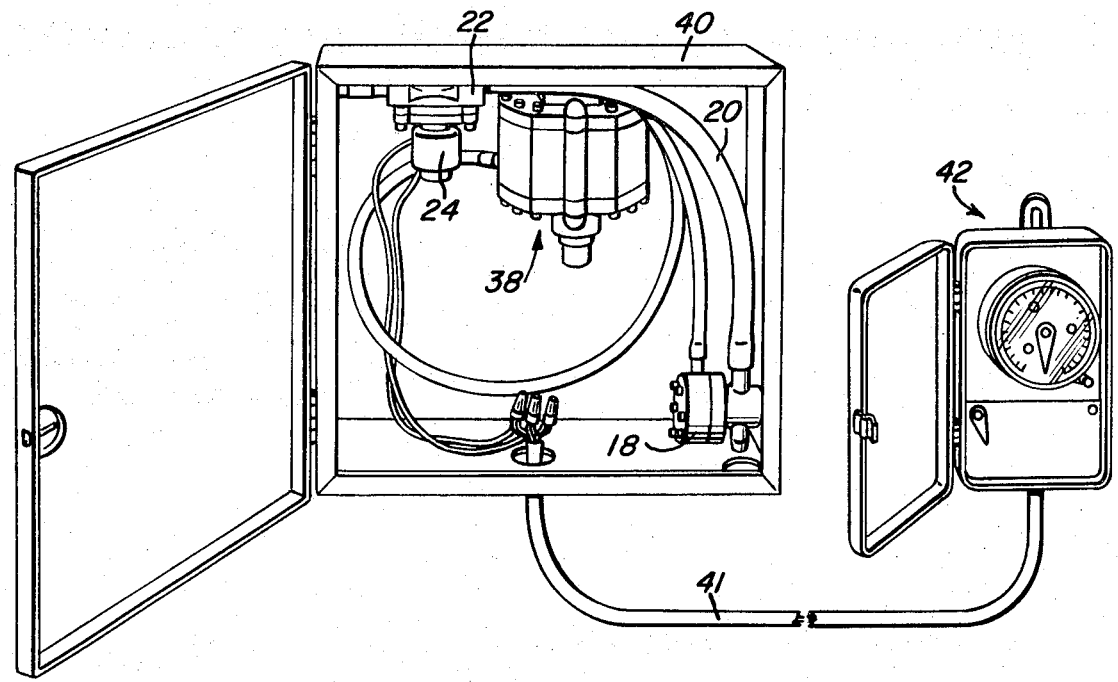

United States Patent [19]
Harden

[11] 3,763,878
[45] Oct. 9, 1973

[54] CHLORINATING APPARATUS FOR SWIMMING POOLS

[75] Inventor: Darrel G. Harden, Norman, Okla.

[73] Assignee: Carefree International, Inc., Oklahoma City, Okla.

[22] Filed: Aug. 24, 1971

[21] Appl. No.: 174,388

[52] U.S. Cl........ 137/114, 137/624.12, 137/624.15, 210/169
[51] Int. Cl............................................. F16k 19/00
[58] Field of Search................... 210/138, 139, 169; 137/114, 624.12, 624.13, 624.15

[56] References Cited
UNITED STATES PATENTS

| | | | |
|---|---|---|---|
| 3,194,254 | 7/1965 | Zmek | 137/114 |
| 3,586,050 | 6/1971 | Totten | 137/624.15 |
| 3,267,964 | 8/1966 | Steinmetz | 137/624.13 |
| 3,672,391 | 6/1972 | Livingston et al. | 137/624.15 X |
| 3,672,508 | 6/1972 | Simon | 210/169 X |

Primary Examiner—Robert G. Nilson
Attorney—Clarence A. O'Brien et al.

[57] ABSTRACT

Chlorine gas is controllably introduced into the water of a swimming pool by circulation of the water through an ejector to which the gas is fed. A clock-controlled circuit is operative simultaneously with a motor driven pump circulating the water, to control opening and closing of valves through which the water and gas is conducted to the ejector in accordance with a selected operational mode.

6 Claims, 2 Drawing Figures

PATENTED OCT 9 1973

3,763,878

CHLORINATING APPARATUS FOR SWIMMING POOLS

This invention relates to controlled feeding of gaseous chlorine into circulating swimming pool water.

In treating swimming pool water with gaseous chlorine, there is a loss of chlorine which varies in accordance with many factors. There is, therefore, a need for apparatus to supply gaseous chlorine to the swimming pool water in accordance with certain demands and variable loss in such a manner as to avoid constant monitoring and with sufficient safe guards to prevent accidental accumulation of chlorine gas in the supply lines. Accordingly, it is an important object of the present invention to provide an economical, yet safe system for chlorinating swimming pool water.

In accordance with the present invention, a time clock, repeat cycle timer, ejector and assembly of solenoid valves, are arranged to automatically circulate swimming pool water and supply gaseous chlorine thereto at a rate adjusted in accordance with pool conditions and chlorine demand. The repeat cycle timer when operated in one operational mode of the system, causes a solenoid water valve to be opened for a selected period of time. When the water valve is opened, water flows through the ejector creating a vacuum which opens a chlorine valve through which chlorine gas flows from a reservoir for mixing with the circulating water in the ejector. Positive cutoff of flow of both the circulating water and chlorine gas is effected whenever the water circulating pump is inoperative. The circulating pump, ejector and solenoid valve assemblies are conveniently mounted within a common enclosure.

Figure 2:
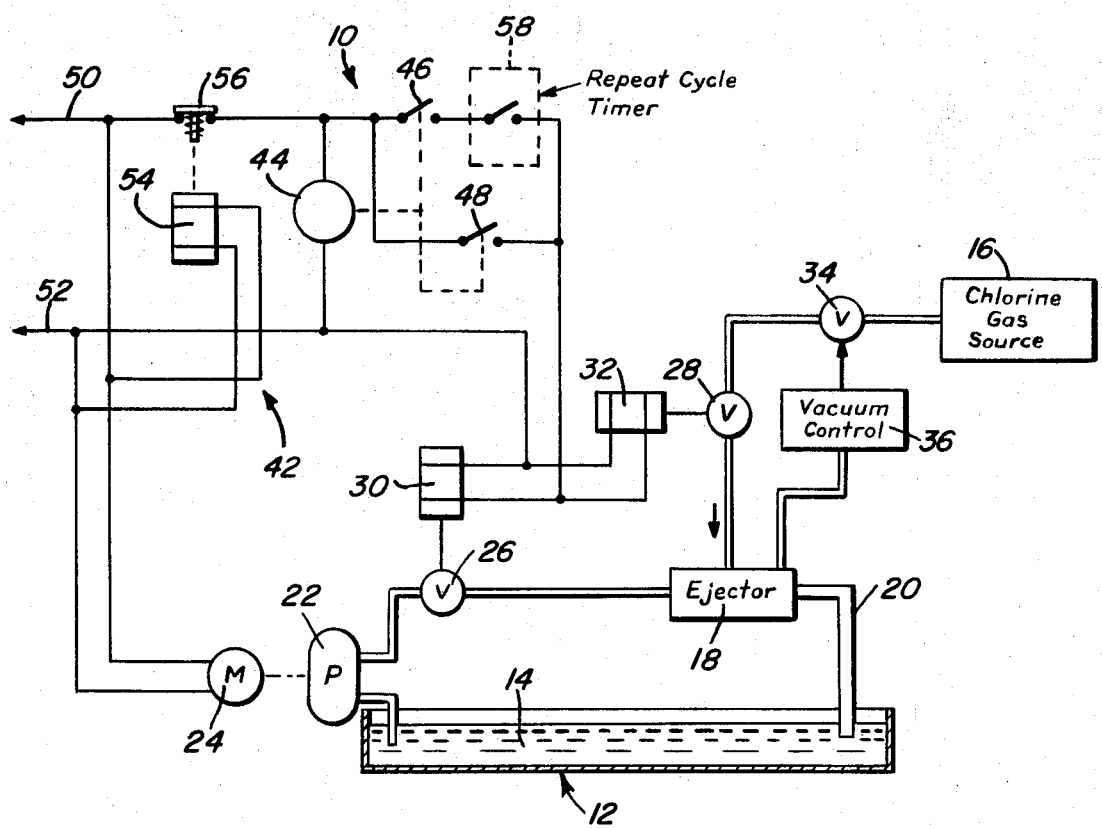

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the equipment associated with the system of the present invention; and FIG. 2 is a schematic circuit diagram illustrating the system of the present invention.

Referring now to the drawings in detail, FIG. 2 illustrates the system of the present invention generally referred to by reference numeral 10 associated with a body of liquid such as a swimming pool generally referred to by reference numeral 12. The system is adapted to treat the water 14 within the swimming pool by introducing thereinto chlorine gas from a suitable reservoir 16. The chlorine gas is accordingly mixed with water that is circulated through an ejector 18 having an outlet 20 from which the circulated water mixed with chlorine gas is returned to the swimming pool. Circulating flow of the water through the ejector is effected by a pump 22 driven by an electric motor 24. Flow of water and chlorine gas to the ejector is conducted through valves 26 and 28, respectively, controlled by solenoid operators 30 and 32. A chlorine gas valve 34 also interconnects the chlorine gas source 16 and the solenoid valve 28 in order to prevent flow of chlorine gas until there is a flow of circulating water through the ejector. Accordingly, opening of the valve 34 is effected by means of a vacuum control 6 connected to the ejector for sensing flow of water therethrough.

The motor 24, pump 22, ejector 18 and the assembly of solenoid operated valves 38 are conveniently enclosed within a housing 40, as shown in FIG. 1. The solenoid valve assemblies are electrically interconnected through cable 42 to a timer controlled circuit within the control box 42.

As shown in FIG. 2, the timer controlled circuit includes a 24 hour setable clock mechanism 44 of any suitable type adapted to alternatively close an intermittant feed switch 46 or a continuous feed switch 48 depending upon the setting of the clock mechanism, during a selected interval of time. The clock mechanism is connected across the power lines 50 and 52 which are connected to a suitable source of electrical energy, such as a 110 VAC supply. The power lines are connected to the motor 24 for operation of the pump 22 as well as to operate the clock mechanism. As a safety feature, if there is any power failure or malfunction of the pump motor 24, the relay 54 will be deenergized so as to open an interlock switch 56 through which power line 50 is connected to the clock mechanism 44 and the circuits controlled thereby. Thus, in the event of any power failure, the solenoid valve operators 30 and 32 will be deenergized thereby closing the associated valves 26 and 28 to prevent any flow of circulating water and chlorine gas.

The solenoid valve operators 30 and 32 are simultaneously energized to open the associated valves when a circuit is completed therethrough upon closing of either the intermittant feed switch 46 or the continuous feed switch 48 connected in parallel between the power supply and the parallel connected solenoid operators. When the continuous feed switch 48 is closed, the solenoid operators will be continuously energized during a selected interval set on the clock mechanism 44 so that a continuous supply of circulating water and chlorine gas will be maintained during the selected interval. On the other hand, when the intermittant feed switch 46 is closed, current is cyclely fed to the solenoid valve operators through a repeat cycle timer 58 to alternately open and close the valves 26 and 28 during the selected timing interval in order to control the rate of supply of chlorine gas to the swimming pool water in accordance with a predetermined chlorine demand. The clock mechanism 44 and repeat cycle timer which are commercially available items are set to meet predetermined conditions in accordance with the desired operational mode as aforementioned.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a source of gas and an ejector through which liquid is circulated from a reservoir, a system for treating the liquid comprising a source of electrical energy, motor driven pump means energized by said source of electrical energy and connected to the ejector for inducing circulating flow of the liquid from the reservoir through the ejector, power operated valve means rendered operative by said source of electrical energy for conducting flow of the liquid and the gas to the ejector, means responsive to flow of liquid through the ejector for selectively connecting the source of gas to the valve means, and gas feed control means connected to the valve means for selecting the intervals during which flow is conducted through the valve means, said gas feed control means comprising timing means connecting the source of electrical energy to the power operated valve means for opening thereof during the selected intervals and mode control means for alternatively opening and closing the valve means in cycles or maintaining the valve means continuously open during the selected intervals.

2. The combination of claim 1 including interlock means for closing the valve means in response to failure of the source of electrical energy.

3. The combination of claim 2 wherein said mode control means includes a repeat cycle timer and a continuous feed switch connected in parallel between the source of energy and the valve means.

4. The combination of claim 3 wherein said gas is chlorine and the liquid is water.

5. The combination of claim 1 wherein said mode control means includes a repeat cycle timer and a continuous feed switch connected in parallel between the source of energy and the valve means.

6. In combination with a source of gas and an ejector through which liquid is circulated from a reservoir, a system for treating the liquid comprising motor driven pump means connected to the ejector for inducing circulating flow of the liquid from the reservoir through the ejector, power operated valve means rendered operative for conducting flow of the liquid and the gas to the ejector means responsive to flow of liquid through the ejector for selectively connecting the source of gas to the valve means, and gas feed control means connected to the valve means for selecting the intervals during which flow is conducted through the valve means, and mode control means for alternatively opening and closing the valve means in cycles or maintaining the valve means continuously open during the selected intervals.

* * * * *